United States Patent [19]

Cook et al.

[11] Patent Number: 4,484,644
[45] Date of Patent: Nov. 27, 1984

[54] SINTERED AND FORGED ARTICLE, AND METHOD OF FORMING SAME

[75] Inventors: John P. Cook, Hopewell; Bani R. Banerjee, Skillman, both of N.J.

[73] Assignee: Ingersoll-Rand Company, Woodcliff Lake, N.J.

[21] Appl. No.: 183,593

[22] Filed: Sep. 2, 1980

[51] Int. Cl.³ .............................................. E21B 10/00
[52] U.S. Cl. .................................. 175/410; 76/108 A; 175/409; 51/309; 75/232; 75/246
[58] Field of Search ................ 428/565; 75/208, 228, 75/232, 246; 51/309; 175/410, 409, 416, 243; 419/6, 18; 76/5 R, 108 R, 108 A, 108 T, DIG. 11

[56] References Cited

U.S. PATENT DOCUMENTS

| | | | |
|---|---|---|---|
| 542,542 | 7/1895 | Symonds | 175/243 |
| 1,283,542 | 11/1918 | Anzulovich | 175/104 |
| 1,793,757 | 2/1931 | Smith | 419/48 |
| 1,809,780 | 6/1931 | Gebauer | 419/47 |
| 2,313,227 | 3/1943 | DeBats | 428/565 |
| 2,582,231 | 1/1952 | Catallo | 51/309 |
| 3,034,589 | 5/1962 | Hagstrom | 175/410 |
| 3,080,009 | 3/1963 | Baker | 175/410 |
| 3,142,893 | 8/1964 | Bradbury et al. | 75/246 |
| 3,168,925 | 2/1965 | Gayley | 175/410 |
| 3,175,260 | 3/1965 | Bridwell et al. | 164/97 |
| 3,715,792 | 2/1973 | Prill et al. | 75/236 |
| 3,734,723 | 5/1973 | Blasch et al. | 419/5 |
| 3,744,993 | 7/1973 | Matt et al. | 419/31 |
| 3,761,257 | 9/1973 | Dunn | 419/6 |
| 3,778,261 | 12/1973 | Nicholas et al. | 419/11 |
| 3,787,205 | 1/1974 | Church | 419/23 |
| 3,802,849 | 4/1974 | Kimura et al. | 428/582 |
| 3,816,112 | 6/1974 | Heck | 419/8 |
| 3,899,821 | 8/1975 | Ito et al. | 419/28 |
| 4,002,471 | 1/1977 | Sarnes et al. | 419/28 |
| 4,074,778 | 2/1978 | Morrell et al. | 175/91 |
| 4,101,318 | 7/1978 | Rudy | 75/240 |

*Primary Examiner*—Mark Bell
*Attorney, Agent, or Firm*—B. J. Murphy

[57] ABSTRACT

An embodiment of the article comprises a metallic body formed, by a powder metallurgy technique, of steel powder and tungsten carbide particles, and forged, having a total density of not less than one hundred percent. The method, then, comprises (a) the powder metallurgy steps of forming and sintering the body, and (b) the subsequent forging step, to produce the one hundred percent total density steel and tungsten carbide article.

10 Claims, 14 Drawing Figures

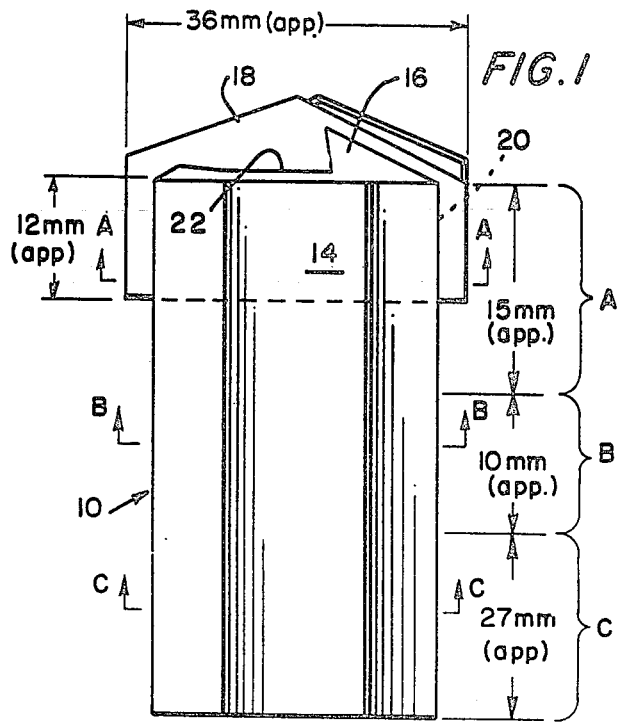
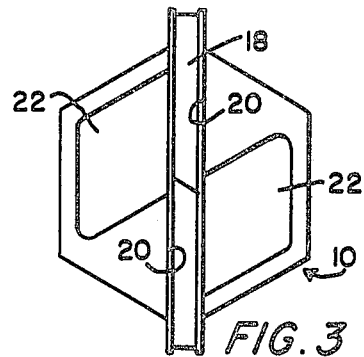
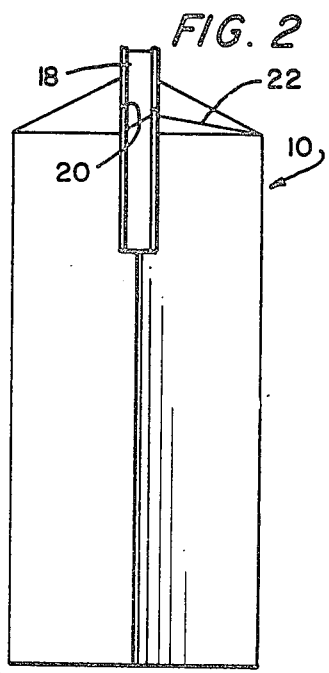
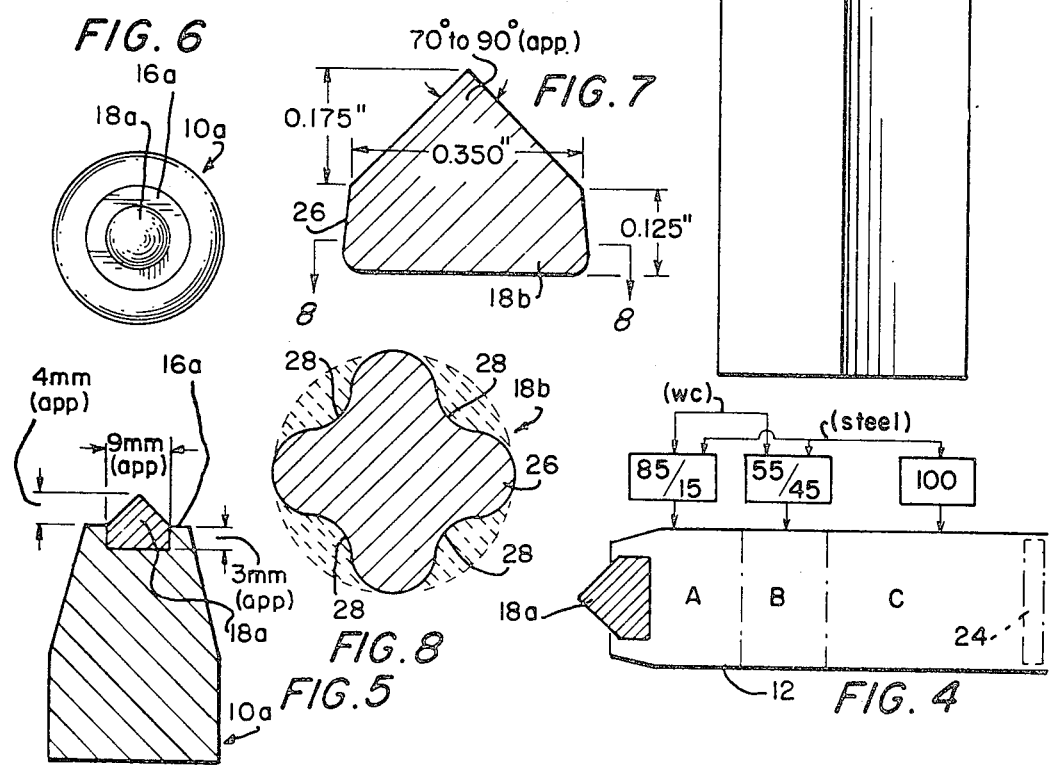

SINTERED AND FORGED ARTICLE, AND METHOD OF FORMING SAME

This invention pertains to metallic, sintered-body articles, and to methods of forming same, and in particular to such articles formed of a given base metal added to, or to which has been added, a hardening constituent, and to methods of forming such hardening-constituent and base metal articles.

It is already known in the prior art to form a tungsten-carbide sintered-body article having a base metal, such as nickel or cobalt, as the carbide vehicle. Such articles are manufactured for use as inserts in rock-cutting bits, coal picks, and the like, due to the hardness and excellent wear properties of the carbides. In the forming process, the nickel or cobalt vehicle is uniformly diffused to coat and bond the carbide particles together. When the formed articles are put to use, however, exposed areas of the vehicle (nickel, cobalt, etc.) readily wear away, and subject bound carbide particles to separation. Hence, wear and abrasion of such articles proceed from a failure of the binder-vehicle rather than from a degeneration of the carbide.

The technology, practiced in melt, isostatic or hydrostatic sintering, recognizes that, due to its carbon content, steel is not suitable as a carbide vehicle. Of course, in the known, non-melting processes of sintering, it will not be possible to uniformly diffuse a dry steel powder to coat or film the carbide particles. Such is the thinking in, or the state of, the art, presently.

It is an object of this invention to teach a steel and tungsten carbide, "solid-state" (i.e., an appropriately dispersed mixture of steel powder and carbide particles) method of pre-forming or consolidating, sintering, and final-forming of an article, contrary to the accepted techniques in this art, to render such article with not less than one hundred percent total density.

Concomitantly, it is an object of this invention to set forth an article comprising a metallic body formed, by a powder metallurgy technique, of steel and tungsten carbide forged, having a total density of not less than one hundred percent.

Metallic, sintered-body articles have especial utility as machine parts, tools, rock-cutting bits, and the like, where hard wear and toughness is not required uniformly throughout the part, tool, etc. Rather, in each such component there is typically a working end or working face, or the like, which needs hardening or strengthening more than does the remaining or residual portion thereof. Also, the particularly effective hardening constituents, such as tungsten carbide, are quite expensive. Hence, it is economically prohibitive to uniformly disperse such additive throughout an article.

It is therefore another object of this invention to set forth a relatively inexpensive sintered and forged article having areas of differing hardness, and a method of forming such.

Particularly, it is an object of this invention to disclose a sintered and forced article, having areas of differing hardness, comprising a metallic, sintered and forged body; said body comprising a matrix formed from a plurality of ingredients comprising metal powders and particles; and said body having a plurality of matrix cross-sections which are constituted by ratios, of one of said ingredients to another thereof, which ratios of said cross-sections are each distinguished from any other thereof.

It is also an object of this invention to set forth a method of forming a sintered and forged article having areas of differing hardness, comprising the steps of mixing together a plurality of ingredients comprising metal powder and particles; placing the mixed ingredients into a receiver; pressing the mixed ingredients into a compact or preform; and sintering the compact or preform; wherein said mixing step comprises mixing a given quantity of a first ingredient with a prescribed quantity of a second ingredient, to define a first ingredient blend; said mixing step also comprises mixing a same given quantity as aforesaid, of said first ingredient with a quantity of said second ingredient which is different from said prescribed quantity, to define a second ingredient blend; and wherein said placing step comprises placing said first ingredient blend into a first area of said receiver, and placing said second ingredient blend into a second area of said receiver; and hot-forging the compact or preform into an article of a final size and conformation with a one hundred percent total density.

Further objects of this invention, as well as the novel features thereof, will become more apparent by reference to the following description taken in conjunction with the accompanying figures, in which:

FIG. 1 is a side elevational view of a metallic sintered-body article, the same being an earth cutter bit, according to an embodiment of the invention;

FIG. 2 is an end elevational view, taken from the right-hand side of FIG. 1, of the article of FIG. 1;

FIG. 3 is a top or plan view of the article of FIGS. 1 and 2;

FIG. 4 is a pictorial and line illustration of an ingredient blends receiver for forming therein a general conformation of a to-be-compacted article;

FIG. 5 is a vertical, cross-sectional view of a bottom-bit type of earth cutter according to an embodiment of the invention;

FIG. 6 is a plan view of the FIG. 5 earth cutter;

FIG. 7 is a side elevation of a bottom-bit, according to an embodiment of the invention;

FIG. 8 is a cross-sectional view taken along section 8—8 of FIG. 7;

Figure 9:
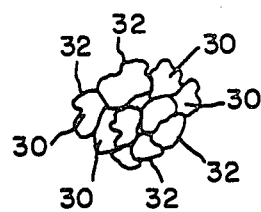
FIG. 9 is an enlarged depiction of a mix of tungsten carbide particles and steel powder.
Figure 10:
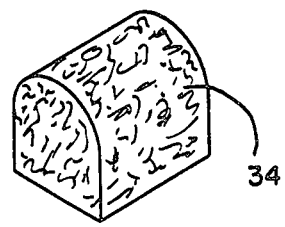
FIG. 10 is an illustration of a particles and powder compacted preform.
Figure 11:
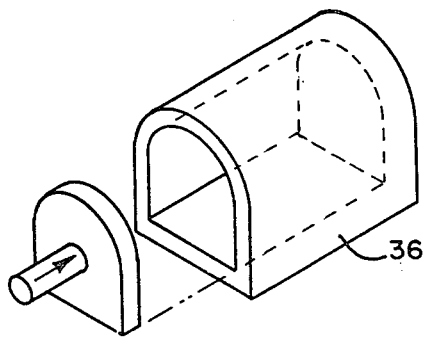
FIG. 11 is a simplified illustration of the FIG. 10 preform in a forging die.

The method of the invention will be particularly understood by reference by FIGS. 9 through 13, in which FIG. 9 illustrates an enlarged, small portion of a mix tungsten carbide particles 30 and steel powder 32. In the manner well known in powder metallurgy techniques, the particles 30 and powder 32 are thoroughly mixed, in a mill or the like, so that the powder 32 is uniformly diffused and coats the particles 30. As is common in the techniques, wax or the like and an appropriate organic solvent are also used in the mix initially to fix the latter into a homogeneous mass. Then, the mass is pressed into a preform 34 (FIG. 10) of the to-be-produced article. The preform is then dry sintered; i.e., the tering is carried out under temperatures which do not cause the hard constituent (tungsten carbide) and steel powder mass to melt. However, the wax binder, and an organic solvent of course, dissipate in a gaseous state. Finally, the sintered preform 34 is placed in a forging die 36 (FIG. 11), and forged into final conformation.

Figure 12:
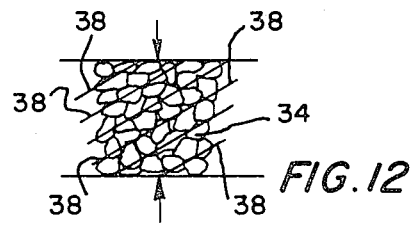
FIG. 12 is a depiction of a being-forged preform undergoing plane shear deformation.
Figure 14:
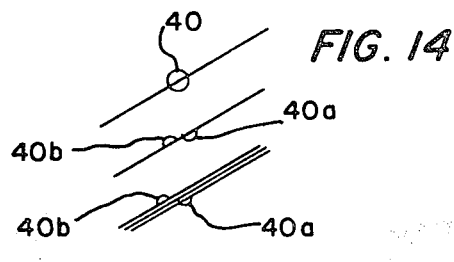
FIG. 14 illustrates the progressive elimination of a given void, due to shear deformation of the preform in which it resides during forging.
Figure 13:
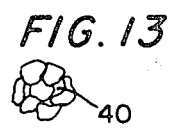
FIG. 13 illustrates the presence of a void, within a fragmentary portion of a preform.

During the sintering, the preform 34 acquires approximately a fifty to ninety percent total density. In the forging of the preform 34, the product achieves its final conformation with a one hundred percent density. This issues from the fact that the forging causes plane shear deformation of the mass. FIG. 12 depicts the shear lines 38 which occur during the forging totally to eliminate any voids within the mass of the preform 34. Prior art practices, such as hot isostatic sintering, impress equal forces on all sides of the preform mass. Now, typically, within the mass there will obtain a multiplicity of voids 40 (FIG. 13). The uniformly impressed forces of hot isostatic sintering do not eliminate the voids; rather, they diminish the size thereof, but render them highly pressured. Accordingly, these voids less the portions of the mass in which they reside. In forging the preform 34, according to our invention, the plane shearing subdivides the voids 40 (FIG. 14) and displaces the portions 40a and 40b thereof. A next forging impact subdivides the portions 40a and 40b, and so on, until the voids 40 and all diminishing elements thereof are non-existent. Hence, the finally conformed, forged article has a one hundred percent total density.

According to an embodiment of the invention, a metallic, sintered-body article 10, defined as an earth cutter, shown in FIGS. 1-3, is formed by mixing steel powder with tungsten carbide particles (FIG. 4), placing the mixed powder and particles in a receiver 12 and, according to known powder metallurgy techniques, as aforesaid, pressing the powder and particles mix into a compact or preform, and then dry-sintering the latter. However, toward (1) economizing on the amount of tungsten carbide used, (2) efficiently placing the latter in the article compact or preform, and (3) especially uniquely hardening or toughening the article 10 at its working end, the invention teaches the preparation of different powder and particles blends.

The article 10, the earth cutter bit, has a working end with a working face 16. Accordingly, end 14 is formed with an especially-carbide-enriched blend. The article 10 may be considered, arbitrarily, as having three zones: zone "A", comprising the working end 14, an intermediate zone "B", and a non-working or coupling end, zone "C". According to the novel method, the article 10 is formed from a first powder and particles blend of eighty-five percent tungsten carbide particles and fifteen percent steel powder which is consigned to zone "A". A blend of fifty-five percent tungsten carbide particles and forty-five percent steel powder is consigned to zone "B". Zone "C" is consigned one hundred percent steel powder.

The word *consigned* is used to denote that such powders and particles or powder and particles blends are introduced into a receiver, such as receiver 12, for the aforesaid zones. Yet, with the pre-forming pressing and dry-sintering of the being-formed article 10, the zone divisions become smooth transitions. At the "interface" of zones "A" and "B", following sintering, there may in fact obtain a composition of seventy percent tungsten carbide and thirty percent steel, and at the interface of zone "B" and "C", the resultant composition may be seventy or seventy-five percent steel and thirty or twenty-five percent tungsten carbide. In any event, at the cross-sections A—A, B—B and C—C will be found the powder or powder blends introduced into the receiver. Axially, through the article 10, however, there will be formed no sharp, distinct gradations of composition, hence, the article 10 is formed with no inherent "weak points". Rather, it is substantially, uniformly and progressively hardened or strengthened toward end 14. Following the dry-sintering, and in accordance with the novel method, the pre-formed article 10 is hot-forged, at approximately 1800 to 2000 degrees F., and with 40 to 70 tons per square inch, approximately, to conform the article 10 to final dimensions and configuration.

Thus article 10, for comprising an earth cutter bit, has a cutting insert 18 received and held in a transverse slot 20. Cuttings flushing holes 22 are arranged in close adjacency to the insert 18 more efficiently to extract the cuttings from the working face 16. The body of the article 10 is defined with a hexagonal configuration, the walls thereof, carried up close to the insert, provide uncommon strength to the security of the insert 18. This, plus the tungsten carbide enrichment of zone "A" (as well as that of intermediate zone "B") provides a wear-resistant quality for face 16, and a sure retention of insert 18.

In one practice of the novel method, the article 10 is pre-formed with the slot 20, as noted, so that, following sintering, the insert 18 can be emplaced. Then the article 10 is forged—the more securely to capture the insert 18. By virtue of this novel method, the insert 18, of a hard-metal carbide, such as tungsten carbide, need not have a typical, prior art depth for entry into the body of the article 10. For instance, in the depicted embodiment, the insert 18 is approximately thirty-six mm. wide, but only approximately twelve mm. of its transverse dimension is needed to nest it in the slot 20. The carbide enrichment of zone "A" and the forging of the article 10 with the insert in place, obviate the need for more, expensive, further-nested depth of the insert.

The article 10, alternatively, may be formed with a cutting element of protrusion, like insert 18, integrally formed as part of the body of the article. In this practice, zone "A" will comprise (in the forming receiver) a protruding area into which the zone "A" powder and particles mix migrates. The latter mix, then, can be ninety-five percent tungsten carbide particles to five percent steel powder, or it may be wholly tungsten carbide.

To define the article 10 with a recess (for an earth cutter insert, or the like), it is only necessary to interpose an obstruction into the receiver 12, as shown in FIG. 4. Here, the obstruction is an earth cutter, tungsten carbide button 18a. As, typically, sintering results in a shrinkage of the subject material, the degree of protrusion of the obstruction has to be pre-determined with the anticipated shrinkage taken into account. The receiver 12 has such aforesaid zones "A", "B", and "C" into which the tungsten carbide particles and steel powders are charged, and then a ram 24 (or the equivalent) is used to press the powders into a preform—for subsequent forging.

FIGS. 5 and 6 depict an article 10a into the nose of which is fixed the insert 18a. As with article 10, the metal zone circumscribing and bedding the insert 18a is a steel-powder matrix which is heavily enriched with tungsten carbide particles. Again, this circumstance, together with subsequent forging of the article perform, requires that not more than approximately forty percent of the height of the insert 18a need be nested into the working face 16a.

Further to the teaching of how to economize on the usage of expensive tungsten carbide, is the insert 18b shown in FIGS. 7 and 8. This insert embodiment also discloses an improved base configuration drawn to the purpose of securely nesting the insert in an article. The base 26, shown here to be 0.125-inch deep, is all that needs to be set into an aperture to retain the insert 18b in place. The base 26 has a bottom-enlarged taper, with contributes to the locking-in of the insert; the greater, 0.175-inch "working" prominence is wholly exposed for useful work.

FIG. 8 shows that the base 26 has peripheral undulations 28 formed therein. Outboard of the undulations 28, shown in dashed outline, are the quantities of tungsten carbide saved by virtue of not having formed the base, as is conventional in the prior art, fully circular. The vertically-extending, rounded ribs, which obtain between the undulations 28, provide ample strength to the insert 18b, and perhaps fifteen or twenty percent of tungsten carbide, which would otherwise have been expended in forming the insert, is unnecessary.

While we have described our invention in connection with specific embodiments, and methods of practice, it is to be clearly understood that this is done only by way of example and not as a limitation to the scope of our invention is set forth in the objects thereof and in the appended claims. For example, by taking teaching from our disclosure, it will occur to others that diversely-hardened earth cutter bits, similar to the tungsten carbide button 18a, can be formed. Such a bit can be preformed and forged with a central zone of perhaps ninety-five percent tungsten carbide particles and five percent steel powder, an adjacent zone of perhaps ninety percent tungsten carbide particles and ten percent steel powder, a next zone of perhaps eighty percent tungsten carbide particles and twenty percent steel powder, and so on, until an outermost zone may have but five or ten percent tungsten carbide particles and ninety or ninety-five percent steel powder. This teaching, clearly, can be employed in forming zone-hardened shafts, or bearing races, or bearing rollers, or tool surfaces (i.e., noses on hammer heads, and hardware-engaging recesses or coves in wrenches), or the tips or leading ends of (a) moil points, or (b) mining machine earth picks. The uses to which our teaching can be put have not been exhausted by the aforesaid discussion, and all practices of our novel method, and the fabrication of articles of whatever nature or conformation and purpose, defined in accordance with this disclosure, are deemed to be within the ambit of our teaching and comprised by the appended claims.

We claim:

1. A sintered and hot-forged article, having areas of differing hardness, comprising:

a metallic, sintered and forged body;

said body comprising a matrix homogeneously formed from a pair of ingredients comprising steel powder and tungsten carbide particles; and said body having a first matrix cross-section constituted by a first ratio of one of said ingredients to the other thereof, and a second matrix cross-section constituted by a second ratio of said one ingredient to said other ingredient; and wherein said first ratio is approximately eighty-five percent tungsten carbide to fifteen percent steel powder, and said second ratio is approximately fifty-five percent tungsten carbide to forty-five percent steel powder.

2. An article, according to claim 1, wherein:

said body has an insert-receiving recess formed therein; and further including a hard-metal insert fixed in said recess; wherein said insert has a greatest width of a given dimension; and said recess has a depth of not more than approximately one-third said given dimension.

3. An article, according to claim 1, wherein:

said body has a working face, and a hard-metal formation extending outwardly from said face; and said formation comprises means for disintegrating earth structures.

4. An article, according to claim 3, wherein:

said formation is an integral portion of said homogeneously-formed body matrix.

5. An article, according to claim 3, wherein:

said formation is a discrete insert held by said body.

6. An article, according to claim 5, wherein:

said insert has a given height dimension; and said insert is held by said body through not more than approximately half of said given dimension.

7. An article, according to claim 5, wherein:

said insert has a base at one end and a nose portion contiguous therewith;

only said end base is held by said body; and said base is formed with a tapered configuration having the greatest transverse dimension thereof spaced apart from said nose portion, and the smallest transverse dimension coincident with, and defining a commencement of, said nose portion.

8. An article, according to claim 7, wherein:

said base is not more than approximately 0.125-inch (3.175 mm.) in depth.

9. An article, according to claim 7, wherein:

said insert has a given height dimension; and said base comprises not more than approximately forty percent of said dimension.

10. An article, according to claim 5, wherein:

said insert has a base at one end and a nose portion contiguous therewith; and said base has an undulated periphery.

* * * * *